United States Patent [19]
King

[11] Patent Number: 5,832,811
[45] Date of Patent: Nov. 10, 1998

[54] WATER ROTISSARATOR

[76] Inventor: Hunter King, 3198 Buford Dr., Burford, Ga. 30158

[21] Appl. No.: 732,050

[22] Filed: Oct. 17, 1996

[51] Int. Cl.⁶ .............................. A47J 37/00; A47J 37/04
[52] U.S. Cl. ........................... 99/421 H; 99/419; 99/473; 99/516
[58] Field of Search .................... 99/330, 339, 340, 99/352–355, 400, 401, 446–450, 467, 473–476, 481, 482, 516, 534–536; 122/106, 282, 250 R; 60/668–670, 645, 698, 711, 715, 716; 126/20, 25 R, 9 R, 610, 642, 643; 219/400, 401; D7/338

[56] References Cited

U.S. PATENT DOCUMENTS

| | | | |
|---|---|---|---|
| D. 349,419 | 8/1994 | Koopman | D7/338 |
| 3,866,526 | 2/1975 | Eng | 99/446 X |
| 3,901,136 | 8/1975 | Wilson et al. | 99/352 |
| 4,181,074 | 1/1980 | Hieb | 99/421 HH |
| 4,332,188 | 6/1982 | Rhear | 99/340 |
| 4,750,414 | 6/1988 | Dohrs | 99/419 |
| 4,810,856 | 3/1989 | Jovanovic | 219/401 |
| 4,924,766 | 5/1990 | Hitch | 99/421 H |
| 4,979,439 | 12/1990 | Ferron-Zepeda | 99/421 R |
| 5,323,692 | 6/1994 | Grzywna et al. | 99/421 H |
| 5,485,780 | 1/1996 | Koether et al. | 219/400 |
| 5,562,022 | 10/1996 | Schmid et al. | 99/419 |
| 5,586,489 | 12/1996 | Fraga | 99/419 |

*Primary Examiner*—Timothy F. Simone

[57] ABSTRACT

A new Water Rotissarator for providing a steam powered rotisserie which can be utilized within an oven without an external power source. The inventive device includes a pan member having a reservoir, a steam powered motor coupled to the reservoir, a rod coupled to the motor rotatably projecting to the opposite side of the pan member, and a sprocket secured to the rod opposite of the motor with a catch member to prevent reverse rotation.

5 Claims, 3 Drawing Sheets

WATER ROTISSARATOR

BACKGROUND OF THE INVENTION

1. Field of the Invention

The present invention relates to Rotisserie Devices and more particularly pertains to a new Water Rotissarator for providing a steam powered rotisserie which can be utilized within an oven without an external power source.

2. Description of the Prior Art

The use of Rotisserie Devices is known in the prior art. More specifically, Rotisserie Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Rotisserie Devices include U.S. Pat. No. 4,810,856; U.S. Pat. No. 4,181,074; U.S. Design Pat. No. 349,419; U.S. Pat. No. 3,901,136; U.S. Pat. No. 4,924,766 and U.S. Pat. No. 4,979,439.

While these devices fulfill their respective, particular objectives and requirements, the aforementioned patents do not disclose a new Water Rotissarator. The inventive device includes a pan member having a reservoir, a steam powered motor coupled to the reservoir, a rod coupled to the motor rotatably projecting to the opposite side of the pan member, and a sprocket secured to the rod opposite of the motor with a catch member to prevent reverse rotation.

In these respects, the Water Rotissarator according to the present invention substantially departs from the conventional concepts and designs of the prior art, and in so doing provides an apparatus primarily developed for the purpose of providing a steam powered rotisserie which can be utilized within an oven without an external power source.

SUMMARY OF THE INVENTION

In view of the foregoing disadvantages inherent in the known types of Rotisserie Devices now present in the prior art, the present invention provides a new Water Rotissarator construction wherein the same can be utilized for providing a steam powered rotisserie which can be utilized within an oven without an external power source.

The general purpose of the present invention, which will be described subsequently in greater detail, is to provide a new Water Rotissarator apparatus and method which has many of the advantages of the Rotisserie Devices mentioned heretofore and many novel features that result in a new Water Rotissarator which is not anticipated, rendered obvious, suggested, or even implied by any of the prior art Rotisserie Devices, either alone or in any combination thereof.

To attain this, the present invention generally comprises a pan member having a reservoir, a steam powered motor coupled to the reservoir, a rod coupled to the motor rotatably projecting to the opposite side of the pan member, and a sprocket secured to the rod opposite of the motor with a catch member to prevent reverse rotation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Water Rotissarator apparatus and method which has many of the advantages of the Rotisserie Devices mentioned heretofore and many novel features that result in a new Water Rotissarator which is not anticipated, rendered obvious, suggested, or even implied by any of the prior art Rotisserie Devices, either alone or in any combination thereof.

It is another object of the present invention to provide a new Water Rotissarator which may be easily and efficiently manufactured and marketed.

It is a further object of the present invention to provide a new Water Rotissarator which is of a durable and reliable construction.

An even further object of the present invention is to provide a new Water Rotissarator which is susceptible of a low cost of manufacture with regard to both materials and labor, and which accordingly is then susceptible of low prices of sale to the consuming public, thereby making such Water Rotissarator economically available to the buying public.

Still yet another object of the present invention is to provide a new Water Rotissarator which provides in the apparatuses and methods of the prior art some of the advantages thereof, while simultaneously overcoming some of the disadvantages normally associated therewith.

Still another object of the present invention is to provide a new Water Rotissarator for providing a steam powered rotisserie which can be utilized within an oven without an external power source.

Yet another object of the present invention is to provide a new Water Rotissarator which includes a pan member having a reservoir, a steam powered motor coupled to the reservoir, a rod coupled to the motor rotatably projecting to the opposite side of the pan member, and a sprocket secured to the rod opposite of the motor with a catch member to prevent reverse rotation.

Still yet another object of the present invention is to provide a new Water Rotissarator that utilizes steam power to rotate a rotisserie.

Even still another object of the present invention is to provide a new Water Rotissarator that efficiently cooks food without the requirement of an external power source.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
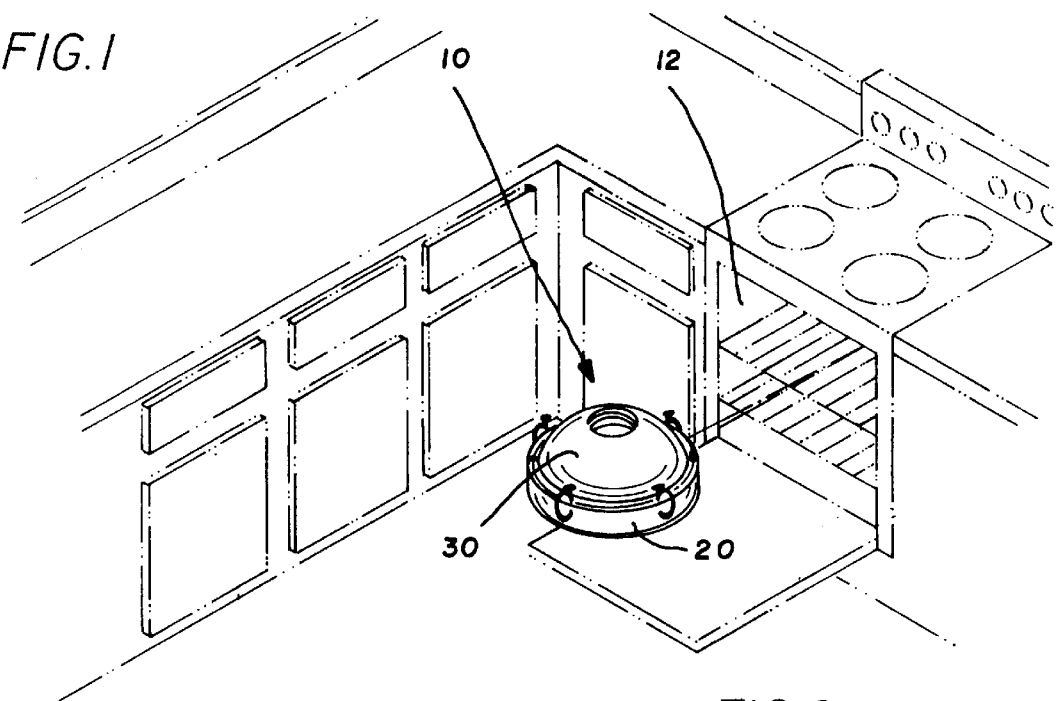
FIG. 1 is an upper perspective view of a new Water Rotissarator according to the present invention.

With reference now to the drawings, and in particular to FIGS. 1 through 6 thereof, a new Water Rotissarator embodying the principles and concepts of the present invention and generally designated by the reference numeral 10 will be described.

More specifically, it will be noted that the Water Rotissarator 10 comprises a pan member 20 having a reservoir 22, a steam powered motor coupled to the reservoir 22, a rod 48 coupled to the motor rotatably projecting to the opposite side of the pan member 20, and a sprocket 60 secured to the rod 48 opposite of the motor with a catch member 62 to prevent reverse rotation.

Figure 2:
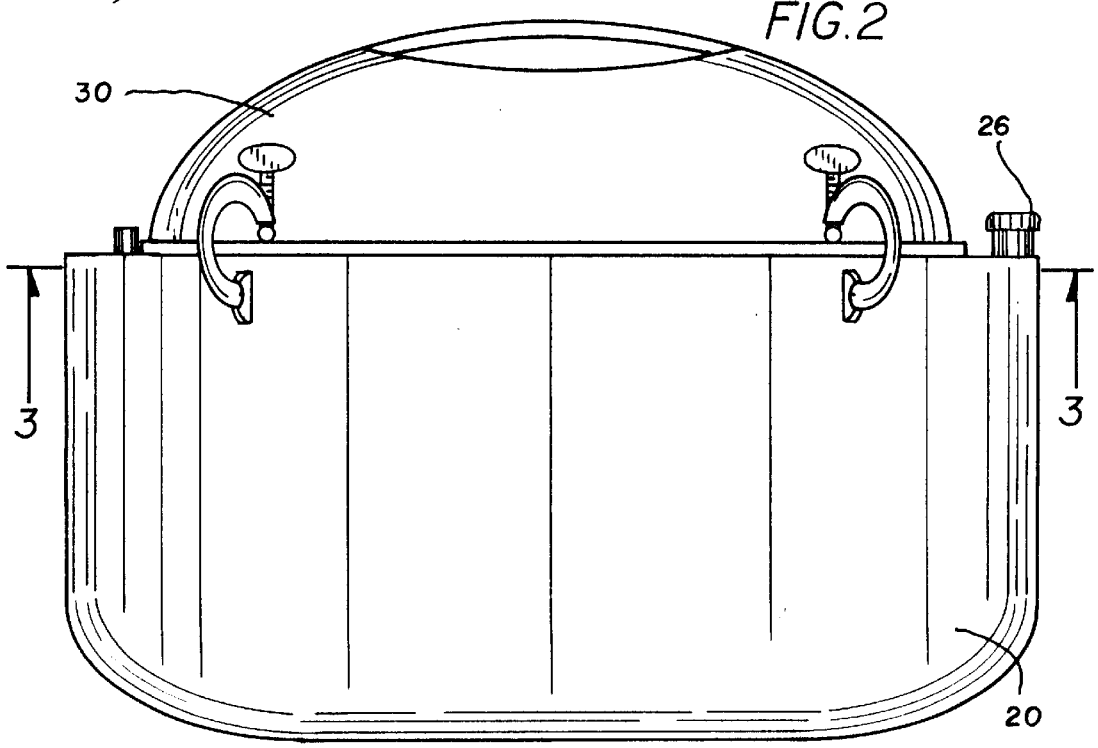
FIG. 2 is a side view of the present invention.
Figure 3:
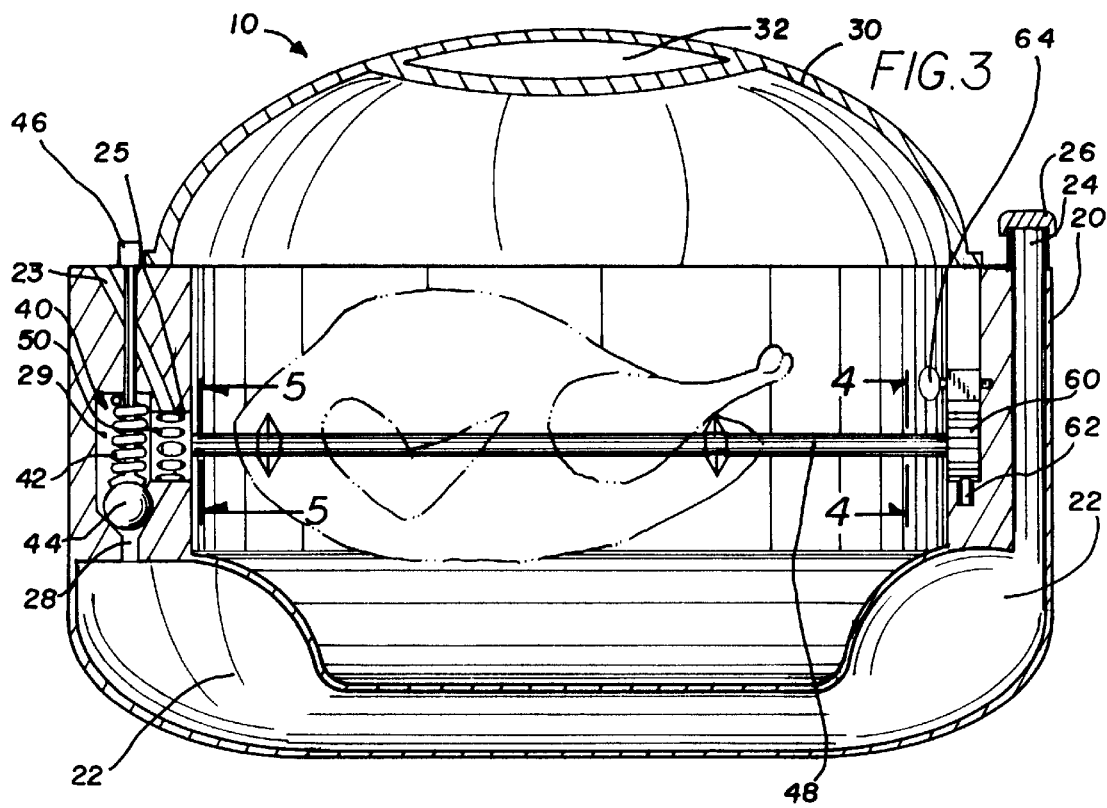
FIG. 3 is cross sectional view taken along line 3—3 of FIG. 2.
Figure 4:
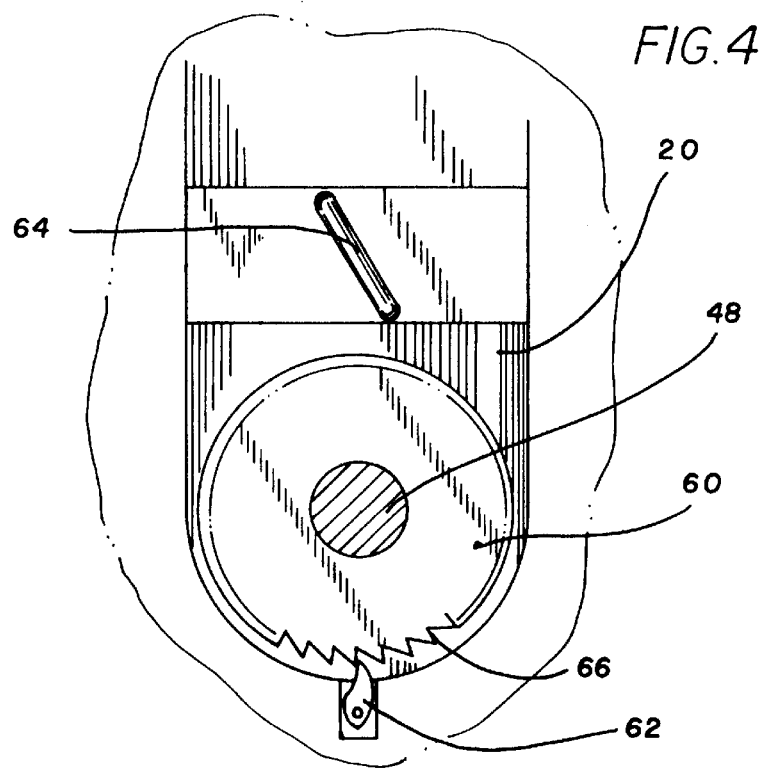
FIG. 4 is a cross sectional view taken along line 4—4 of FIG. 3.

As best illustrated in FIGS. 1 through 6, it can be shown that the pan member 20 has a cooking cavity 27 and reservoir 22 within the bottom portion. As shown in FIG. 3, a fill passage 24 connects to the reservoir 22 where a cap 26 threadably couples to and seals the fill passage 24.

Figure 5:
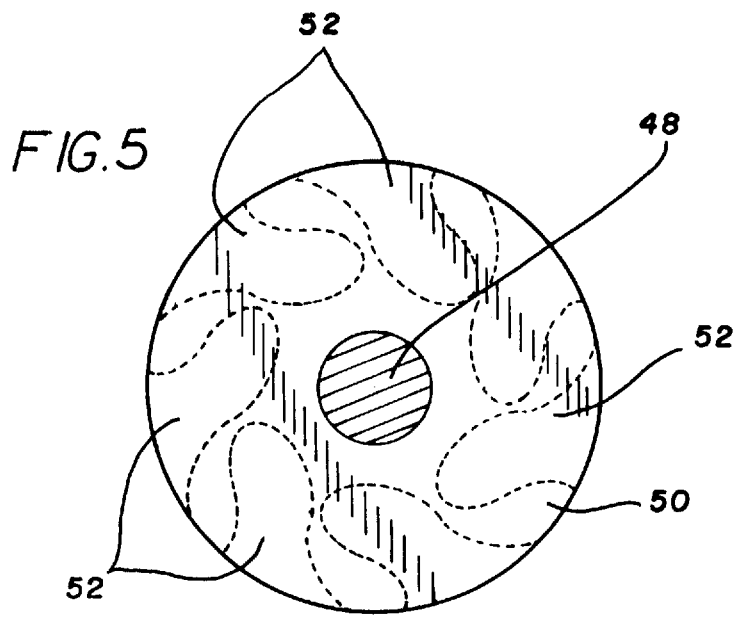
FIG. 5 is a cross sectional view taken along line 5—5 of FIG. 3.
Figure 6:
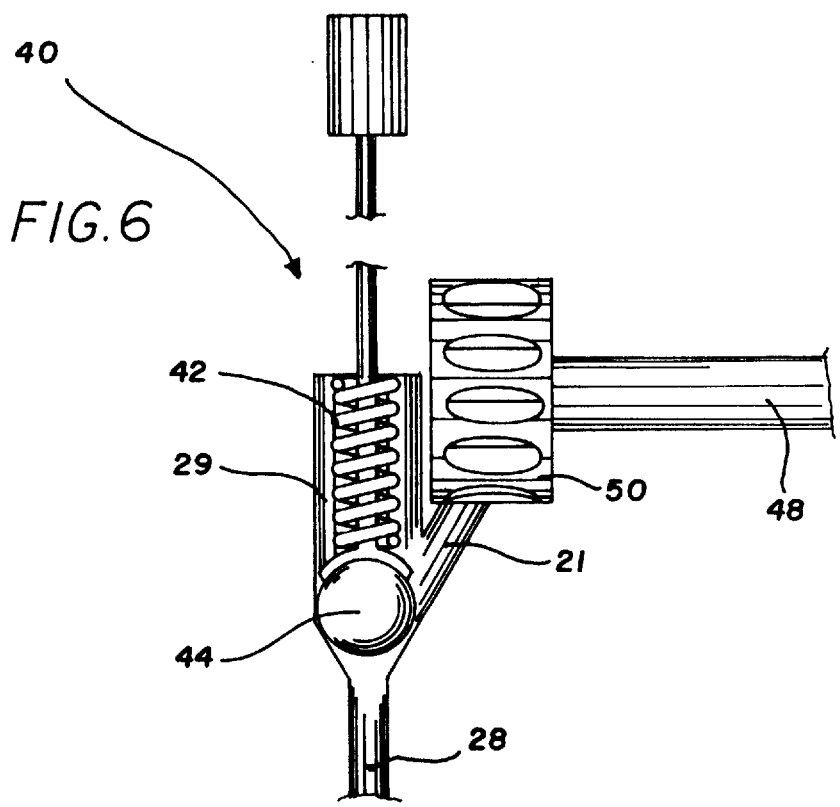
FIG. 6 is a cut away view of the steam motor.

As shown in FIGS. 3 through 6, a steam motor 40 is connected to the reservoir 22. The steam motor 40 receives steam produced from the heating of water within the reservoir 22 in an oven 12 to power the steam motor 40. As shown in FIG. 3, the steam motor 40 has a steam passage 28 connected to the reservoir 22. A spring chamber 29 is connected to the steam passage 28 opposite of the reservoir 22. A compression spring 42 is positioned within the spring chamber 29 engaging a ball 44 which seals the steam passage. The end of the compression spring 42 opposite of the ball 44 engages the spring chamber 29 opposite of the steam passage 28. A first passage 21 is connected to the spring chamber 29 adjacent the steam passage 28 as shown in FIG. 6 of the drawings. The first passage 21 receives the steam from the reservoir 22. A cylindrical cavity 25 is coaxially aligned with the rod 48 and connected near the bottom to the first passage 21 opposite of the spring chamber 29 as shown in FIG. 3. An exit passage 23 is connected to the upper portion of the cylindrical cavity 25 which exits out of the pan member 20 to release the steam which passes through the first passage 21 into the cylindrical cavity 25. A cylindrical member 50 is rotatably positioned within the cylindrical cavity 25 and coaxially aligned with and coupled to the rod 48. The cylindrical member 50 has a plurality of steam catch cavities 52 along the outer perimeter edge as shown in FIGS. 3, 5 and 6. The steam catch cavities 52 capture the steam from the first passage 21 and cause rotation of the cylindrical member 50 and thereafter release the captured steam out through the exit passage 23.

As shown in FIGS. 3 through 6, the rod 48 rotatably extends between the cooking cavity 27, where the rod 48 retains the food 14 to be cooked. A sprocket 60 having a plurality of slanted notches 66 is secured to the rod 48 opposite of the steam motor 40. A catch member 62 pivotally engages the slanted notches 66 to prevent reversal of the rotation of the rod 48. A locking member 64 rotatably projects through the pan member 20 to selectively engage the sprocket 60 to prevent rotation of the rod 48. As shown in FIGS. 1 through 3, a lid 30 having a concentrically positioned aperture 32 into the cornice removably couples to the pan member 20 to enclose the cooking cavity 27. A pressure relief valve 46 is preferably connected to the spring chamber 29 in the event that the cylindrical member 50 is unable to rotate to prevent extreme pressure build up.

In use, water is funneled into the fill passage 24 which fills the reservoir 22. The invention is positioned within the heated oven 12 which thereafter heats the water which thereafter produces steam. The steam exits the reservoir 22 through the exit passage 28 by forcing the ball 44 upwardly thereby opening the exit passage 28 to the spring chamber 29 and compressing the compression spring 42. The steam thereafter enters the first passage 21 where it enters at least one steam catch cavity 52, thereby rotating the cylindrical member 50 which is coupled to the rod 48. The rotation of the rod 48 is allowed in only one direction by the catch member 62 engaging the slanted notches 66. The steam thereafter exits through the exit passage 23 where it radiates out from within the pan member 20. Alternatively, where the user desires no rotation of the rod 48, the catch member 62 may be engaged to the sprocket 60 thereby preventing rotation of the rod 48. The steam then is released through the pressure relief valve 46 connected to the spring chamber 29.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Water Rotissarator comprising:

a pan member having a cooking cavity and reservoir within the bottom portion and a fill passage connecting to said reservoir where a cap threadably couples to and seals said fill passage;

a steam motor connected to said reservoir, whereby said steam motor receives steam produced from the heating of water within said reservoir; and a rod secured to said steam motor rotatably extending between said cooking cavity, where said rod retains food to be cooked.

2. The Water Rotissarator of claim 1, wherein a sprocket having a plurality of slanted notches is secured to said rod opposite of said steam motor and a catch member pivotally engages said slanted notches thereby preventing reverse rotation of said rod.

3. The Water Rotissarator of claim 2, wherein a locking member rotatably projects through said pan member to selectively engage said sprocket to prevent rotation of said rod.

4. The Water Rotissarator of claim 3, wherein said steam motor comprises:

a steam passage connected to said reservoir;

a spring chamber connected to said steam passage opposite of said reservoir;

a compression spring positioned within said spring chamber mesial a ball engaging said steam passage and the end of said spring chamber opposite of said steam passage;

a first passage connected to said spring chamber adjacent said steam passage, where said first passage receives said steam from said reservoir;

a cylindrical cavity coaxially aligned with said rod and connected near the bottom to said first passage opposite of said spring chamber;

an exit passage connected to the upper portion of said cylindrical cavity which exits out of said pan member to release said steam which passes through said first passage into said cylindrical cavity;

a cylindrical member rotatably positioned within said cylindrical cavity and coaxially aligned with and coupled to said rod; and said cylindrical member including a plurality of steam catch cavities along the outer perimeter edge, whereby said steam catch cavities capture said steam from said first passage and cause rotation of said cylindrical member and thereafter release said captured steam out through said exit passage.

5. The Water Rotissarator of claim 4, wherein a lid including a concentrically positioned aperture into the cornice removably couples to said pan member to enclose said cooking cavity.

* * * * *